United States Patent
Salvatore

(10) Patent No.: US 6,431,496 B1
(45) Date of Patent: Aug. 13, 2002

(54) METHOD AND APPARATUS FOR OPERATING SATELLITES IN ORBIT

(75) Inventor: Jeremiah O. Salvatore, Redondo Beach, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 95 days.

(21) Appl. No.: 09/716,010

(22) Filed: Nov. 17, 2000

Related U.S. Application Data

(63) Continuation-in-part of application No. 09/249,398, filed on Feb. 12, 1999, now abandoned.

(51) Int. Cl.[7] ................................................ B64G 1/10
(52) U.S. Cl. ..................................................... 244/158 R
(58) Field of Search .......................... 244/158 R; 701/13

(56) References Cited

U.S. PATENT DOCUMENTS

| | | | |
|---|---|---|---|
| 3,706,037 A | 12/1972 | Lundgren | 325/343 |
| 3,836,969 A | 9/1974 | Bond et al. | 343/100 |
| 3,995,801 A | 12/1976 | Bond | 244/158 R |
| 4,502,051 A | 2/1985 | Dondl | 343/356 |
| 4,691,882 A | 9/1987 | Young | 244/158 R |
| 5,120,007 A | 6/1992 | Pocha et al. | 244/158 R |
| 5,158,249 A | 10/1992 | Uphoff | 244/161 |
| 5,506,780 A | 4/1996 | Montenbruck et al. | 364/159 |
| 5,528,502 A | 6/1996 | Wertz | 364/459 |
| 5,813,634 A | 9/1998 | Pizzicardi et al. | 244/176 |
| 5,957,409 A | 9/1999 | Castiel et al. | 244/158 R |
| 6,050,525 A | 4/2000 | Drake | 244/158 R |
| 6,126,116 A | * 10/2000 | Cellier | 244/158 R |
| 6,241,192 B1 | * 6/2001 | Kondo et al. | 244/158 R |
| 6,286,787 B1 | * 9/2001 | Fleeter | 244/158 R |
| 6,305,646 B1 | * 10/2001 | McAllister et al. | 244/158 R |

* cited by examiner

Primary Examiner—Robert P. Swiatek
(74) Attorney, Agent, or Firm—V. D. Duraiswamy; M. W. Sales

(57) ABSTRACT

A satellite system that is coordinatable with a geostationary belt having a plurality of geostationary positions includes an eccentric satellite orbit having a predetermined angle of inclination with respect to the equatorial plane and a non-coincident equatorial crossing node with the geostationary belt. The method of positioning a satellite includes the steps of providing a satellite into a geostationary belt and positioning the satellite in a substantially geosynchronous (24 hr. period) second orbit so that the second orbit is eccentric non-intersecting with the geostationary belt upon the sensing of a predetermined condition indicative of an impending failure on-board the satellite.

35 Claims, 1 Drawing Sheet

METHOD AND APPARATUS FOR OPERATING SATELLITES IN ORBIT

RELATED APPLICATION

The present application is a continuation in part of U.S. application Ser. No. 09/249,398 entitled "Method and Apparatus For Storing Satellites in Orbit" filed Feb. 12, 1999, now abandoned, and which is hereby incorporated by reference herein.

TECHNICAL FIELD

The present invention relates to space and communications satellites, and more particularly, to a method for operating a satellite to prevent physical interference between a satellite that experiences a control loss with operating satellites in orbit.

BACKGROUND ART

Satellites in geostationary orbits (GEO) have been widely preferred for several decades because of the economic advantages afforded by such orbits. In a geostationary orbit, a satellite traveling above the Earth's equator, in the same direction as the Earth is rotating, and at the same angular velocity, appears stationary relative to a point on the Earth. These satellites are always "in view" at all locations within their service areas, so their utilization efficiency is effectively 100 percent. Antennas at Earth ground stations need be aimed at a GEO satellite only once; no tracking system is required.

Coordination between GEO's and terrestrial services is facilitated by governmental allocation of designated "slots" angularly spaced according to service type. Given the desirability of geostationary satellite orbits and the fact that there are only a finite number of available "slots" in the geostationary "belt," the latter capacity has been essentially saturated with satellites operating in desirable frequency bands up through the Ku-band (up to 18 GHz).

When geostationary satellites approach the end of their useful life, the fuel supply is usually also near depletion. Operators, by mutual agreement, deorbit the spacecraft by raising its altitude above the synchronous radius. This causes the spacecraft to drift harmlessly around the earth for eternity.

It is assumed in this process that attitude and orbit control is possible. If a satellite loses attitude control, the satellite may drift or oscillate in longitude back to the synchronous radius and, thus, may pose a threat of collision with active satellites in the geostationary belt. Radar tracking is required to insure that satellites do not collide, or to provide information to operators so that evasive maneuvers may be performed to avoid collisions.

Other satellites may have redundant control systems which are not fully functional. That is, only one set of electronics may still be operable in an older satellite. Such satellites may also have weakened or non-functional batteries. These satellites are marginally operable satellites. The risk with marginally operable satellites is that during an eclipse, the satellite may lose the control electronics. If this occurs, the satellite may enter another orbital path and pose a risk for other geostationary satellites.

It may also be desirable to place a satellite into an orbit other than the geostationary belt. This may be useful if the particular satellite is no longer needed. However, as previously mentioned above, satellites are typically increased in altitude. By increasing the altitude of the satellite, the satellite shifts by about 1.520 a day to the west with respect to the earth. To move a satellite back into its original position if its use is again desired, a significant amount of fuel may be required. However, it is possible that sufficient fuel may not be available for repositioning the satellite.

It would therefore be desirable to provide a method of operating a satellite that allows marginally operating satellites to remain in service without threatening satellites in the geostationary belt.

SUMMARY OF THE INVENTION

It is therefore an object of the present invention to provide a satellite system that allows for the operation of a satellite in a substantially geostationary orbit so that it will not collide with other geostationary satellites in use should on-board systems ultimately fail.

In one aspect of the invention, a satellite system that is coordinatable with a geostationary belt having a plurality of geostationary positions includes an eccentric satellite orbit having a predetermined angle of inclination with respect to the equatorial plane and a non-coincident equatorial crossing node with the geostationary belt.

In a further aspect of the invention, a method of positioning a satellite comprises the steps of: providing a satellite into a geostationary belt; and, positioning the satellite in a substantially geosynchronous (24 hr. period) second orbit so that the second orbit is eccentric non-intersecting with said geostationary belt upon the sensing of a predetermined condition indicative of an impending failure on-board the satellite.

One advantage of the invention is that after the satellite is moved into the second orbit, the satellite may still be easily tracked and communicated with with the use of a stationary antenna.

The satellite may then be moved back into a standard GEO if the satellite is desired to be used. Moving the satellite back may be particularly useful for a marginally operating satellite that is entering eclipse season. When a satellite is in an eclipse, the power is lost. If the battery or communication circuitry fails, the satellite may drift in orbit without being capable of adjustment. Eventually the satellite may collide with other operational satellites.

Other objects and features of the present invention will become apparent when viewed in light of the detailed description of the preferred embodiment when taken in conjunction with the attached drawings and appended claims.

BEST MODE(S) FOR CARRYING OUT THE INVENTION

The present invention is illustrated herein in terms of satellite orbit systems using a particular inclination angle, eccentricity value, and other values. It should be understood that specific numerical values are introduced as examples and not as final design values.

The essence of the invention is the establishment of an inclined, preferably geosynchronous, satellite orbit that does not intersect the geostationary belt. The orbit is particularly useful for an operational orbit when a satellite is experiencing degradation or an impending failure in a communication system or power system of the like.

Figure 1:
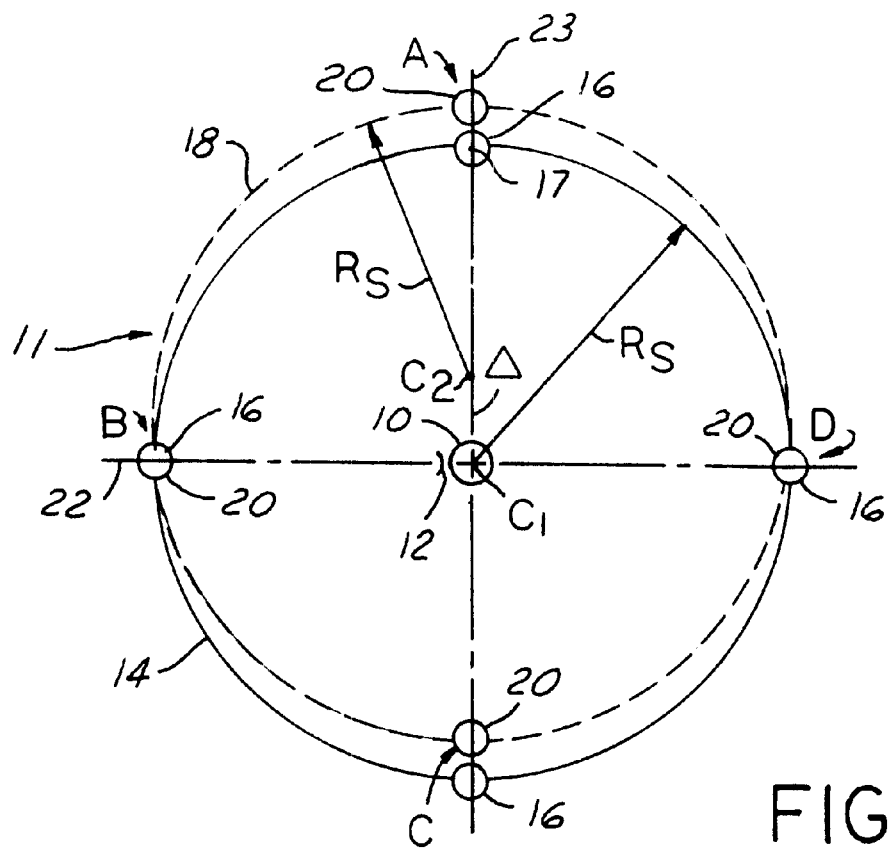
FIG. 1 is a view of a second orbit with respect to a geosynchronous orbit looking down upon the equatorial plane of the earth.

Referring now to FIG. 1, earth 10 has a satellite communications system 11 therearound. The system 11 has a ground station 12 that communicates with satellites in orbit. Earth 10 has a geostationary (GEO) orbit 14 which has a geosynchronous satellite 16 or a plurality of GEO satellites 16 positioned therearound. Geostationary orbit 14 is also referred to as a geostationary belt. The GEO orbit 14 has a radius $R_S$ centered about earth 10 at point $C_1$.

Satellite 16 has a controller 17 that is part of a system used to provide tracking, communications, and satellite control. System control may include such features as sensing system degradation by monitoring the remaining life and operability of crucial systems such as the energy storage system and power generating system as well as the functionality of the communications system. The satellite may send the status of the system to the ground station 12. The ground station 12 may command the movement in response to a degradation of the system. The movement may also be automatically initiated by the satellite so that upon a sensed condition the satellite moves itself into the second orbital plane. At the present time implementation of the latter system is unlikely but may become useful for future spacecraft.

Earth 10 also has a second orbit 18 therearound. Second orbit 18 is elliptical, that is, eccentric in shape. Second orbit 18 has a center $C_2$ that is offset from center $C_1$ by a distance $\Delta$. However, as is shown in FIG. 1, the top view of second orbit 18 appears to be circular having a radial distance $R_S$ from center $C_2$.

As shown, the satellite is moved into the various positions 20 of second orbit 18.

An aries line 22 is illustrated as a horizontal line through earth 10. Aries line 22 is also known in the art as an Aries line. Aries line 22 is defined as the line through the center of the earth in the direction of the sun on March $21^{st}$; that is, the spring equinox when the sun passes from below the equatorial plane to above the equatorial plane.

A line of nodes 23 is defined as the position in which the satellite 16 crosses the equatorial plane. In the preferred embodiment, the line of nodes 23 is positioned perpendicular to the aries line 22 and parallel to the line connecting the closest approach (perigee) and the point of approach (apogee). This line is known as the apse line.

Figure 2:
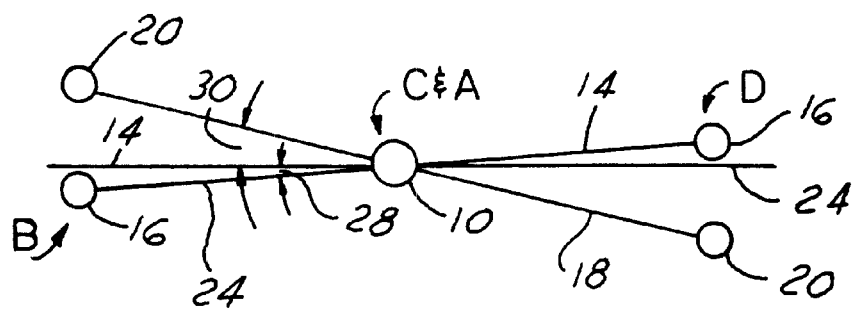
FIG. 2 is a side view of the second orbit and geostationary belt looking at the edge of the equatorial plane of the earth.

Referring now to FIG. 2, the edge of equatorial plane 24 is shown with respect to earth 10. GEO orbit 14 may actually deviate in substantially from equatorial plane 24 by a predetermined amount due to the gravitational pull of the sun and the moon. Variations in longitude are controlled by ground station 12 by east/west station keeping. Changes in latitude are controlled by ground station by north/south station keeping. Thus, by using fuel, the satellite position is maintained.

GEO orbit 14 may thus have an insubstantial angle of inclination 28 with respect to equatorial plane 24. Second orbit 18 has an angle of inclination 30 substantially larger than the angle of inclination 28 of GEO orbit 14. For example, a GEO satellite may deviate in elevation angle between 0° and 0.03° while a satellite in second orbit 18 may deviate between just greater than 0.03° and 0.05°.

In operation, from FIGS. 1 and 2 various observations about GEO orbit 14 and second orbit 18 are evident. In the present example, and as best shown in FIG. 1, various locations of satellites are shown at various times in the orbital path. With respect to position A, the satellites in the two planes are positioned a distance $\Delta$ apart. That is, a satellite in the second plane is located a distance from the earth further than the geostationary belt. Position A is located on the line of nodes 23. Thus, as each of the satellite 16 passes through equatorial plane 24, no chance of a collision is possible due to the radial separation.

As the satellite travels to position B, in FIG. 1, the satellite positions of the two planes appear to be coincident. However, as is best shown in FIG. 2, due to the angle of inclination 30 plus or minus angle 28, a satellite in each of the planes is separated in latitude a distance corresponding to the angle of inclination 30 plus angle 28. In position B, a satellite in the geostationry belt is located below a satellite in the second plane. The positions 16, 20 are located substantially the same distance from earth 10. In movement to position B, the satellite in the second plane moves closer to earth 10.

In position C, a satellite in the second plane would be located closer to earth 10 than a satellite in the geostationary belt. The distance of separation of satellites positioned at 16 and 20 corresponds to the distance at position A.

In position D, a satellite at position 20 of the second plane is located the same distance from earth as a satellite in position 16. In movement from position C to D, a satellite in the second plane moves further away from earth 10.

Orbit 18 is useful for operating a satellite temporarily or permanently. The average effects of solar pressure will average to zero over a year for a satellite that has gone terminal within the second orbit. Thus, if communications are lost with a satellite in second orbit 18, the satellite will continue to maintain its relative position in the orbit without potential of colliding with operational satellites in the geostationary belt.

Normally the satellite will be positioned in the geostationary orbit 14. In response to a degradation of a system within the satellite, the satellite is repositioned into an eccentric satellite second orbit. The second orbital has an orbital plane having a predetermined angle of inclination with respect to the equatorial plane. The orbital plane has a non-coincident equatorial crossing node with the geostationary belt.

While particular embodiments of the invention have been shown and described, numerous variations and alternate embodiments will occur to those skilled in the art. Accordingly, it is intended that the invention be limited only in terms of the appended claims.

What is claimed is:

1. A method of operating a satellite. comprising the steps of:
    positioning the satellite in a geostationary belt having a plurality of geostationary satellite positions;
    sensing a system degradation in the satellite;
    in response to the system degradation, positioning the satellite to an eccentric satellite second orbit defining an orbital plane having a predetermined angle of inclination with respect to the equatorial plane, said orbital plane having a non-coincident equatorial crossing node with the geostationary belt.

2. A method as recited in claim 1 wherein said satellite second orbit has a line of nodes parallel to an apse line.

3. A method as recited in claim 2 wherein along said apse line said second orbit 18 has a first position (A) above said geostationary belt and a second position (L) below said geostationary belt.

4. A method as recited in claim 2 wherein along an aries line said second orbit has a third position and a fourth position having a distance substantially the same as said geostationary belt.

5. A method as recited in claim 1 wherein said satellite second orbit has a center non-coincident with the earth.

6. A method as recited in claim 1 wherein said step of sensing comprises the step of monitoring a battery life.

7. A method as recited in claim 1 wherein said step of sensing comprises the step of monitoring an operation of a communication system.

8. A method as recited in claim 1 wherein said step of positioning the satellite to an eccentric satellite second orbit is controlled by a ground station.

9. A method as recited in claim 1 wherein said step of positioning the satellite to an eccentric satellite second orbit is controlled by the satellite.

10. A method as recited in claim 1 further comprising the steps of repositioning the satellite into a geostationary position.

11. A method as recited in claim 10 wherein said step of sensing comprises the step of monitoring a battery life.

12. A method as recited in claim 10 wherein said step of sensing comprises the step of monitoring an operation of a communication system.

13. A method as recited in claim 10 wherein the step of positioning the satellite comprises the step of positioning the satellite in a first position on the orbit having a distance greater than a distance of the geostationary belt.

14. A method as recited in claim 10 wherein the step of positioning the satellite comprises the step of positioning the satellite in a second position having a distance substantially equal to a distance of the geostationary belt.

15. A method as recited in claim 10 wherein the step of positioning the satellite comprises the step of positioning the satellite in a third position on said orbit having a distance less than a distance of the geostationary belt.

16. A method as recited in claim 10 wherein the step of positioning the satellite comprises the step of positioning the satellite in a fourth position on said orbit having a distance substantially equal to a distance of the geostationary belt.

17. A method as recited in claim 10 further comprising the steps of repositioning the satellite into a geostationary position.

18. A method of operating a satellite comprising the steps of:
 positioning the satellite in a geostationary belt having a plurality of geostationary satellite positions;
 sensing a system degradation in the satellite;
 communicating the system degradation to a ground station; and
 in response to the system degradation, controlling the movement of the satellite through the ground station into a substantially geosynchronous second orbit outside the geostationary belt so that the second orbit is eccentric non-intersecting with said geostationary belt.

19. A method as recited in claim 18 wherein said satellite second orbit has a line of nodes parallel to an apse line.

20. A method as recited in claim 19 wherein along said apse line said second orbit 18 has a first position (A) above said geostationary belt and a second position (L) below said geostationary belt.

21. A method as recited in claim 19 wherein along an aries line said second orbit has a third position and a fourth position having a distance substantially the same as said geostationary belt.

22. A method as recited in claim 18 wherein said satellite second orbit has a center non-coincident with the earth.

23. A method as recited in claim 18 wherein said step of sensing comprises the step of monitoring a battery life.

24. A method as recited in claim 18 wherein said step of sensing comprises the step of monitoring an operation of a communication system.

25. A method as recited in claim 18 wherein said step of positioning the satellite to an eccentric satellite second orbit is controlled by a ground station.

26. A method as recited in claim 18 wherein said step of positioning the satellite to an eccentric satellite second orbit is controlled by the satellite.

27. A method as recited in claim 18 further comprising the steps of repositioning the satellite into a geostationary position.

28. A method as recited in claim 27 wherein said step of sensing comprises the step of monitoring a battery life.

29. A method as recited in claim 27 wherein said step of sensing comprises the step of monitoring an operation of a communication system.

30. A method as recited in claim 27 wherein the step of positioning the satellite comprises the step of positioning the satellite in a first position on the orbit having a distance greater than a distance of the geostationary belt.

31. A method as recited in claim 27 wherein the step of positioning the satellite comprises the step of positioning the satellite in a second position having a distance substantially equal to a distance of the geostationary belt.

32. A method as recited in claim 27 wherein the step of positioning the satellite comprises the step of positioning the satellite in a third position on said orbit having a distance less than a distance of the geostationary belt.

33. A method as recited in claim 27 wherein the step of positioning the satellite comprises the step of positioning the satellite in a fourth position on said orbit having a distance substantially equal to a distance of the geostationary belt.

34. A method as recited in claim 27 further comprising the steps of repositioning the satellite into a geostationary position.

35. A satellite system comprising:
 a satellite capable of being positioned in a first earth orbit in a geostationary belt having a plurality of geostationary satellite positions and in a second orbit in an eccentric satellite orbit defining an orbital plane having a predetermined angle of inclination with respect to the geostationary belt, said orbital plane having a non-coincident equatorial crossing node with the geostationary belt; and,
 a controller for controlling the position of said satellite and sensing a predetermined condition of said satellite indicative of system degradation, said controller controlling the position of said satellite from said first orbit to said second orbit in response to said predetermined condition.

* * * * *